US012769097B2

(12) United States Patent
Zhao et al.

(10) Patent No.: US 12,769,097 B2
(45) Date of Patent: Oct. 20, 2026

(54) REPLACEABLE LENS ELEMENT OF A FISHEYE LENS

(71) Applicant: GoPro, Inc., San Mateo, CA (US)

(72) Inventors: Peiqian Zhao, Mountain View, CA (US); Jonathan Stern, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 232 days.

(21) Appl. No.: 18/659,718

(22) Filed: May 9, 2024

(65) Prior Publication Data

US 2024/0393571 A1 Nov. 28, 2024

Related U.S. Application Data

(60) Provisional application No. 63/468,439, filed on May 23, 2023.

(51) Int. Cl.
*G02B 13/06* (2006.01)
*H04N 23/55* (2023.01)
*H04N 23/698* (2023.01)

(52) U.S. Cl.
CPC ............. *G02B 13/06* (2013.01); *H04N 23/55* (2023.01); *H04N 23/698* (2023.01)

(58) Field of Classification Search
CPC ....... G02B 13/06; H04N 23/55; H04N 23/698
See application file for complete search history.

(56) References Cited

U.S. PATENT DOCUMENTS

| | | | |
|---|---|---|---|
| 751,347 | A | 2/1904 | Scheimpflug |
| 3,760,704 | A | 9/1973 | Baker |
| 3,818,498 | A | 6/1974 | Zehnpfennig |
| 4,109,263 | A | 8/1978 | Johnson |
| 4,119,980 | A | 10/1978 | Baker |
| 5,721,585 | A | 2/1998 | Keast |
| D467,259 | S | 12/2002 | Hung |
| 6,726,331 | B2 | 4/2004 | Miyata |
| 8,149,327 | B2 | 4/2012 | Lin |
| 9,185,279 | B2 | 11/2015 | Masuda |
| 9,389,487 | B2 | 7/2016 | Clyne |
| 9,456,113 | B2 | 9/2016 | Masuda |
| 9,607,358 | B2 | 3/2017 | Takenaka |
| 9,736,372 | B2 | 8/2017 | Masuda |
| 9,992,414 | B2 | 6/2018 | Masuda |
| 10,382,681 | B2 | 8/2019 | Masuda |

(Continued)

OTHER PUBLICATIONS

Randall Hand, "Immersive Media's Dodeca 2360 Spherical Video Camera", VizWorld, Nov. 12, 2025, 4 pages.

(Continued)

*Primary Examiner* — Christina Y. Leung
(74) *Attorney, Agent, or Firm* — Young Basile Hanlon & MacFarlane, P.C.

(57) ABSTRACT

An image capture device with a series of elements, a forward element, and a sensor assembly. The series of elements are aligned along an optical axis and have a field of view of about 180 degrees or more. The forward element removably covers the series of elements, wherein the forward element is curved and configured to capture the field of view of about 180 degrees or more and provide optical power to the series of elements. A sensor assembly is located on the optical axis. The forward element is made of glass.

20 Claims, 7 Drawing Sheets

(56) References Cited

U.S. PATENT DOCUMENTS

| | | | | |
|---|---|---|---|---|
| 10,404,912 | B2 | 9/2019 | Ogawa | |
| 10,652,458 | B2 | 5/2020 | Kang | |
| 10,666,360 | B2 | 5/2020 | Saathoff | |
| 10,666,860 | B2 | 5/2020 | Takenaka | |
| 10,855,919 | B2 | 12/2020 | Masuda | |
| 10,855,979 | B2 | 12/2020 | Pace | |
| 10,969,660 | B2 | 4/2021 | Cotoros | |
| 11,700,443 | B2 | 7/2023 | Cotoros | |
| 11,721,712 | B2 | 8/2023 | Vitale | |
| 11,796,895 | B2 | 10/2023 | Thomas | |
| 2002/0057337 | A1 | 5/2002 | Kumler | |
| 2007/0002131 | A1 | 1/2007 | Ritchey | |
| 2007/0062905 | A1 | 3/2007 | Hung | |
| 2009/0040291 | A1 | 2/2009 | McCall | |
| 2010/0045773 | A1 | 2/2010 | Ritchey | |
| 2012/0023177 | A1 | 1/2012 | Linden | |
| 2014/0192144 | A1 | 7/2014 | St. Clair | |
| 2014/0218587 | A1 | 8/2014 | Shah | |
| 2016/0077314 | A1* | 3/2016 | Nishimura | G02B 13/06 359/708 |
| 2017/0054907 | A1 | 2/2017 | Nishihara | |
| 2020/0133095 | A1* | 4/2020 | Cotoros | G03B 17/14 |
| 2023/0224389 | A1* | 7/2023 | Hill | H04M 1/0264 455/556.1 |

OTHER PUBLICATIONS

The Magazine of Panoramic Imaging, Jun.-Jul. 1996, vol. 13, No. 3, 20 pages.

The Magazine of Panoramic Imaging, Mar.-Apr. 1996, vol. 13, No. 2, 20 pages.

* cited by examiner

REPLACEABLE LENS ELEMENT OF A FISHEYE LENS

CROSS-REFERENCE TO RELATED APPLICATION(S)

This application claims priority to and the benefit of U.S. Provisional Application Patent Ser. No. 63/468,439, filed May 23, 2023, the entire disclosures of which is hereby incorporated by reference.

TECHNICAL FIELD

This disclosure relates to a lens assembly with an outermost element that is replaceable, collimates light, provides optical power (e.g., be part of the optics of the image capture device) within the lens assembly, extends parallel to an adjacent element, or a combination thereof.

BACKGROUND

Image capture devices have been created with one or more image sensors. The one or more image sensors may capture image data to generate images of an environment around the image capture device. The one or more image sensors may include one or more fisheye lenses that capture images around the image capture device.

SUMMARY

Disclosed herein are implementations of a lens assembly that comprises two or more elements. These lens assembly includes fisheye lenses so that images may be captured within about 180 degrees or more of the lens assembly. An outermost element of the lens assembly may be removable. The outermost element may be made of glass. The outer most lens have a curvature and the curvature may substantially mirror a radius of one or more adjacent elements within the lens assembly. The outer most element (e.g., a first element) and a element behind the outer most element (e.g., a second element) may have a radius of curvature that are concentric. All of the elements are aligned along an optical axis. Light may be received and focused via a elements and may be converted to an electronic image signal by an image sensor. The lens assembly have an optical power or optics that transmit light. The outermost element forms part of the optical power or optics of the lens assembly.

The present teachings provide: an image capture device with a series of elements, a forward element, and a sensor assembly. The series of elements are aligned along an optical axis and have a field of view of about 180 degrees or more. The forward element removably covers the series of elements, wherein the forward element is curved and configured to capture the field of view of about 180 degrees or more and provide optical power or be part of the optics to the series of elements that assist in transmitting light through the lens assembly. A sensor assembly is located on the optical axis. The forward element is made of glass.

The present teachings provide: a series of elements with a second element that covers the series of elements and a sensor assembly. The series of elements aligned along an optical axis, the series of elements having a field of view of about 180 degrees or more and including a first lens having a forward side with a first radius of curvature. The second lens that removably covers the series of elements, wherein the second lens is curved so that the series of elements can capture the field of view of about 180 degrees or more through the second lens. The second lens having: a front side with a front radius of curvature a rear side with a rear radius of curvature, wherein the first radius, the front radius, and the rear radius are all concentric. The sensor assembly located on the optical axis.

The present teachings provide: an image capture device with a series of elements with a forward lens forming a front of the series of elements and a sensor assembly. The series of elements aligned along an optical axis. The series of elements having a field of view of about 180 degrees or more. The forward lens that removably covers the series of elements. The forward lens includes a curvature so that the series of elements can capture the field of view of about 180 degrees or more through the forward lens. The curvature of the forward lens directs light into the series of elements so that the light extends along the optical axis in a parallel direction. The sensor assembly is located on the optical axis.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1A:
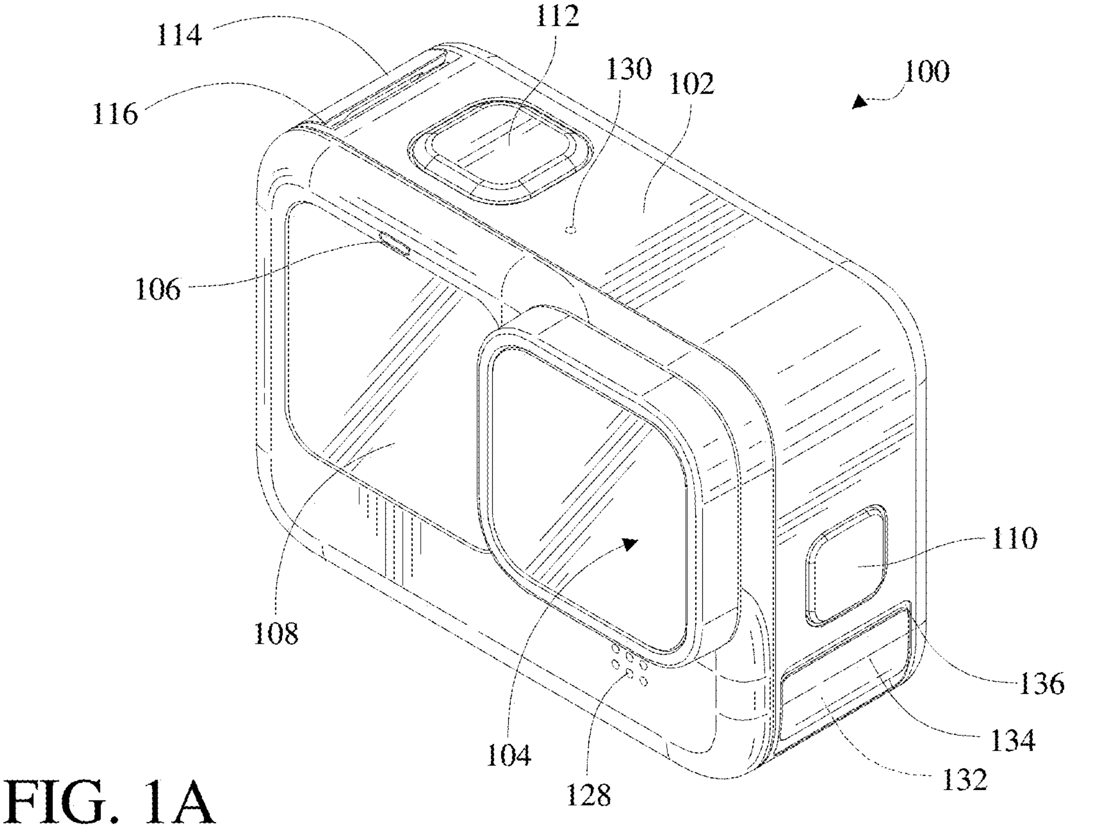
FIGS. 1A-1B are isometric views of an example of an image capture apparatus.

The present teachings relate to an image capture apparatus. The image capture apparatus may include one or more image capture devices. The image capture apparatus may include two image capture devices located substantially back-to-back. The image capture devices may include one or more fisheye lenses. The image capture devices may include an integrated sensor and lens assembly (ISLA) (e.g., a series of elements (i.e., lens elements (lens and element discussed herein are used substantially interchangeably) and a sensor assembly). The series of elements may include a forward element.

The forward element may be both a cover and a first element of the element assembly. The forward element may cover the series of elements. The forward element may be curved. The forward element may be curved so that the image capture device has a field of view of about 180 degrees or more. The forward element may not change optics of the series of elements when the forward elements are interchanged or replaced. For example, the forward element may alter focus of the image capture device so that light is directed in a manner sufficient to generate clear images. In another example, maintaining the forward element on or over the series of elements will not cause distortion or impact the image sharpness. Changing forward lenses will maintain optics without a need for calibration and/or re-calibration of the series of elements. The forward element may direct light towards the optical axis, along the optical axis, or both.

The forward element may have a shape that mirrors a shape of a second element (e.g., an element directly behind the forward element). The forward element may be dome shaped. The forward element may be free of convergence. The element may be generally concave. The element may be generally cylindrical, hemispherical, domed, round, or a combination thereof. The forward element may have a front radius of curvature and a rear radius of curvature. The front radius of curvature and the rear radius of curvature may be concentric, coincident, or both. The second element may have a forward radius of curvature. The forward radius of curvature may be concentric with the front radius of curvature, the rear radius of curvature, or both. The forward radius of curvature, the front radius of curvature, the rear radius of curvature, or a combination thereof may all have a same center, be coincident in space (e.g., along the X-axis, Y-axis, and X-axis), or both. The forward element may collimate light so that the light is directed along the optical axis (e.g., to support generating images associated with the light), towards the optical axis, or both. The forward element may direct light towards the optical axis and then another element may collimate the light. The forward element may prevent light rays from mixing and may direct all of the light rays in a substantially parallel direction. The first element may direct the light into a second element so that the second element continues to direct the light towards the optical axis or a focal point.

The forward element may be made of glass. All of the series of elements may be made of glass. The forward element and the second element may be made of the same material. The forward element, the second element, all of the elements, or a combination thereof may be made of a same material with a same refractive index.

Figure 1B:
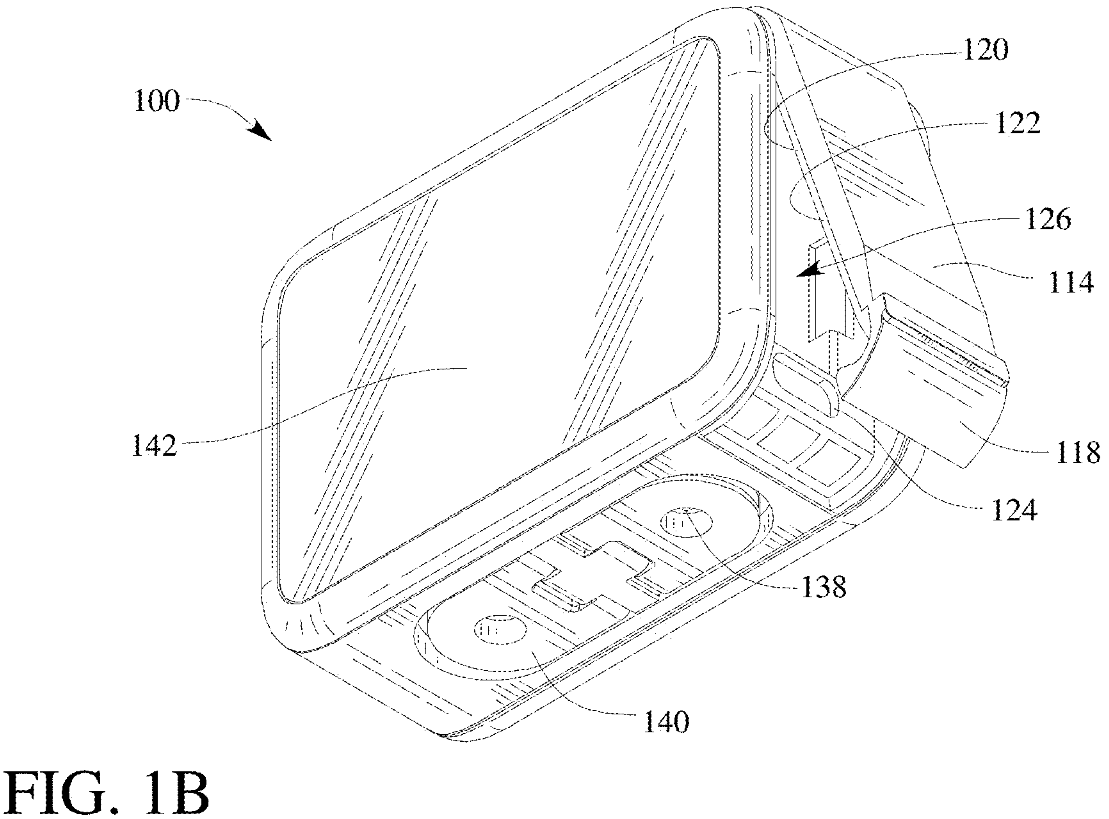

FIGS. 1A-1B are isometric views of an example of an image capture apparatus 100. The image capture apparatus 100 includes a body 102, an image capture device 104, an indicator 106, a display 108, a mode button 110, a shutter button 112, a door 114, a hinge mechanism 116, a latch mechanism 118, a seal 120, a battery interface 122, a data interface 124, a battery receptacle 126, microphones 128, 130, 132, a speaker 138, an interconnect mechanism 140, and a display 142. Although not expressly shown in FIGS. 1A-1B, the image capture apparatus 100 includes internal electronics, such as imaging electronics, power electronics, and the like, internal to the body 102 for capturing images and performing other functions of the image capture apparatus 100. An example showing internal electronics is shown in FIG. 5. The arrangement of the components of the image capture apparatus 100 shown in FIGS. 1A-1B is an example, other arrangements of elements may be used, except as is described herein or as is otherwise clear from context.

The body 102 of the image capture apparatus 100 may be made of a rigid material such as plastic, aluminum, steel, or fiberglass. Other materials may be used. The image capture device 104 is structured on a front surface of, and within, the body 102. The image capture device 104 includes a element. The element of the image capture device 104 receives light incident upon the element of the image capture device 104 and directs the received light onto an image sensor of the image capture device 104 internal to the body 102. The image capture apparatus 100 may capture one or more images, such as a sequence of images, such as video. The image capture apparatus 100 may store the captured images and video for subsequent display, playback, or transfer to an external device. Although one image capture device 104 is shown in FIG. 1A, the image capture apparatus 100 may include multiple image capture devices, which may be structured on respective surfaces of the body 102.

As shown in FIG. 1A, the image capture apparatus 100 includes the indicator 106 structured on the front surface of the body 102. The indicator 106 may output, or emit, visible light, such as to indicate a status of the image capture apparatus 100. For example, the indicator 106 may be a light-emitting diode (LED). Although one indicator 106 is shown in FIG. 1A, the image capture apparatus 100 may include multiple indictors structured on respective surfaces of the body 102.

As shown in FIG. 1A, the image capture apparatus 100 includes the display 108 structured on the front surface of the body 102. The display 108 outputs, such as presents or displays, such as by emitting visible light, information, such as to show image information such as image previews, live video capture, or status information such as battery life, camera mode, elapsed time, and the like. In some implementations, the display 108 may be an interactive display, which may receive, detect, or capture input, such as user input representing user interaction with the image capture apparatus 100. In some implementations, the display 108 may be omitted or combined with another component of the image capture apparatus 100.

As shown in FIG. 1A, the image capture apparatus 100 includes the mode button 110 structured on a side surface of the body 102. Although described as a button, the mode button 110 may be another type of input device, such as a switch, a toggle, a slider, or a dial. Although one mode button 110 is shown in FIG. 1A, the image capture apparatus 100 may include multiple mode, or configuration, buttons structured on respective surfaces of the body 102. In some implementations, the mode button 110 may be omitted or combined with another component of the image capture apparatus 100. For example, the display 108 may be an interactive, such as touchscreen, display, and the mode button 110 may be physically omitted and functionally combined with the display 108.

As shown in FIG. 1A, the image capture apparatus 100 includes the shutter button 112 structured on a top surface of the body 102. The shutter button 112 may be another type of input device, such as a switch, a toggle, a slider, or a dial. The image capture apparatus 100 may include multiple shutter buttons structured on respective surfaces of the body 102. In some implementations, the shutter button 112 may be omitted or combined with another component of the image capture apparatus 100.

The mode button 110, the shutter button 112, or both, obtain input data, such as user input data in accordance with user interaction with the image capture apparatus 100. For example, the mode button 110, the shutter button 112, or both, may be used to turn the image capture apparatus 100 on and off, scroll through modes and settings, and select modes and change settings.

As shown in FIG. 1B, the image capture apparatus 100 includes the door 114 coupled to the body 102, such as using the hinge mechanism 116 (FIG. 1A). The door 114 may be secured to the body 102 using the latch mechanism 118 that releasably engages the body 102 at a position generally opposite the hinge mechanism 116. The door 114 includes the seal 120 and the battery interface 122. Although one door 114 is shown in FIG. 1A, the image capture apparatus 100 may include multiple doors respectively forming respective surfaces of the body 102, or portions thereof. The door 114 may be removable from the body 102 by releasing the latch mechanism 118 from the body 102 and decoupling the hinge mechanism 116 from the body 102.

In FIG. 1B, the door 114 is shown in a partially open position such that the data interface 124 is accessible for communicating with external devices and the battery receptacle 126 is accessible for placement or replacement of a battery. In FIG. 1A, the door 114 is shown in a closed position. In implementations in which the door 114 is in the closed position, the seal 120 engages a flange (not shown) to provide an environmental seal and the battery interface 122 engages the battery (not shown) to secure the battery in the battery receptacle 126.

As shown in FIG. 1B, the image capture apparatus 100 includes the battery receptacle 126 structured to form a portion of an interior surface of the body 102. The battery receptacle 126 includes operative connections for power transfer between the battery and the image capture apparatus 100. In some implementations, the battery receptable 126 may be omitted. The image capture apparatus 100 may include multiple battery receptacles.

As shown in FIG. 1A, the image capture apparatus 100 includes a first microphone 128 structured on a front surface of the body 102, a second microphone 130 structured on a top surface of the body 102, and a third microphone 132 structured on a side surface of the body 102. The third microphone 132, which may be referred to as a drain microphone and is indicated as hidden in dotted line, is located behind a drain cover 134, surrounded by a drain channel 136, and can drain liquid from audio components of the image capture apparatus 100. The image capture apparatus 100 may include other microphones on other surfaces of the body 102. The microphones 128, 130, 132 receive and record audio, such as in conjunction with capturing video or separate from capturing video. In some implementations, one or more of the microphones 128, 130, 132 may be omitted or combined with other components of the image capture apparatus 100.

As shown in FIG. 1B, the image capture apparatus 100 includes the speaker 138 structured on a bottom surface of the body 102. The speaker 138 outputs or presents audio, such as by playing back recorded audio or emitting sounds associated with notifications. The image capture apparatus 100 may include multiple speakers structured on respective surfaces of the body 102.

As shown in FIG. 1B, the image capture apparatus 100 includes the interconnect mechanism 140 structured on a bottom surface of the body 102. The interconnect mechanism 140 removably connects the image capture apparatus 100 to an external structure, such as a handle grip, another mount, or a securing device. The interconnect mechanism 140 includes folding protrusions configured to move between a nested or collapsed position as shown in FIG. 1B and an extended or open position. The folding protrusions of the interconnect mechanism 140 in the extended or open position may be coupled to reciprocal protrusions of other devices such as handle grips, mounts, clips, or like devices. The image capture apparatus 100 may include multiple interconnect mechanisms structured on, or forming a portion of, respective surfaces of the body 102. In some implementations, the interconnect mechanism 140 may be omitted.

As shown in FIG. 1B, the image capture apparatus 100 includes the display 142 structured on, and forming a portion of, a rear surface of the body 102. The display 142 outputs, such as presents or displays, such as by emitting visible light, data, such as to show image information such as image previews, live video capture, or status information such as battery life, camera mode, elapsed time, and the like. In some implementations, the display 142 may be an interactive display, which may receive, detect, or capture input, such as user input representing user interaction with the image capture apparatus 100. The image capture apparatus 100 may include multiple displays structured on respective surfaces of the body 102, such as the displays 108, 142 shown in FIGS. 1A-1B. In some implementations, the display 142 may be omitted or combined with another component of the image capture apparatus 100.

The image capture apparatus 100 may include features or components other than those described herein, such as other buttons or interface features. In some implementations, interchangeable elements, cold shoes, and hot shoes, or a combination thereof, may be coupled to or combined with the image capture apparatus 100. For example, the image capture apparatus 100 may communicate with an external device, such as an external user interface device, via a wired or wireless computing communication link, such as via the data interface 124. The computing communication link may be a direct computing communication link or an indirect computing communication link, such as a link including another device or a network, such as the Internet. The image capture apparatus 100 may transmit images to the external device via the computing communication link.

The external device may store, process, display, or combination thereof, the images. The external user interface device may be a computing device, such as a smartphone, a tablet computer, a smart watch, a portable computer, personal computing device, or another device or combination of devices configured to receive user input, communicate information with the image capture apparatus 100 via the computing communication link, or receive user input and communicate information with the image capture apparatus 100 via the computing communication link. The external user interface device may implement or execute one or more applications to manage or control the image capture apparatus 100. For example, the external user interface device may include an application for controlling camera configuration, video acquisition, video display, or any other configurable or controllable aspect of the image capture apparatus 100. In some implementations, the external user interface device may generate and share, such as via a cloud-based or social media service, one or more images or video clips. In some implementations, the external user interface device may display unprocessed or minimally processed images or video captured by the image capture apparatus 100 contemporaneously with capturing the images or video by the image capture apparatus 100, such as for shot framing or live preview.

Figure 2A:
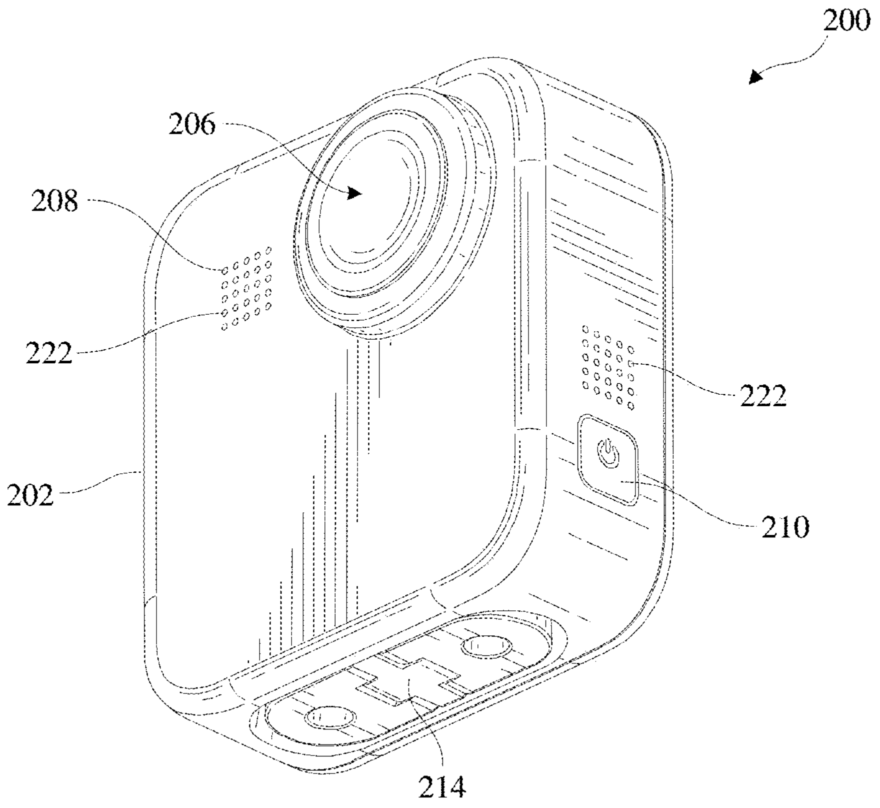
FIGS. 2A-2B are isometric views of another example of an image capture apparatus.
Figure 2B:
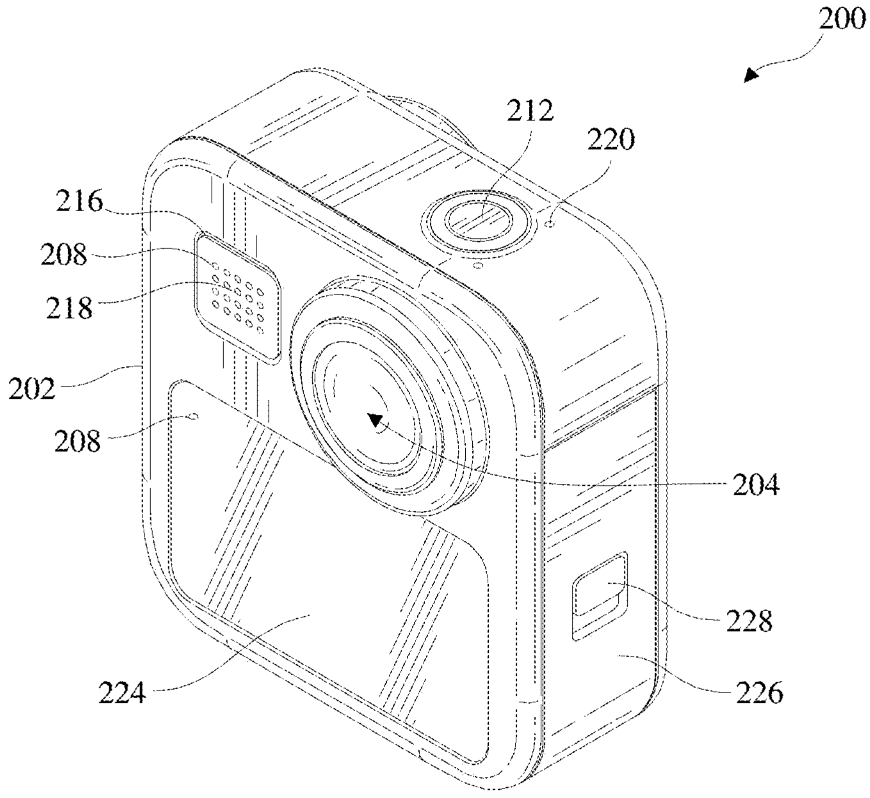

FIGS. 2A-2B illustrate another example of an image capture apparatus 200. The image capture apparatus 200 is similar to the image capture apparatus 100 shown in FIGS. 1A-1B. The image capture apparatus 200 includes a body 202, a first image capture device 204 (including a fisheye lens), a second image capture device 206 (including a fisheye lens), indicators 208, a mode button 210, a shutter button 212, an interconnect mechanism 214, a drainage channel 216, audio components 218, 220, 222, a display 224, and a door 226 including a release mechanism 228. The arrangement of the components of the image capture apparatus 200 shown in FIGS. 2A-2B is an example, other arrangements of elements may be used.

The body 202 of the image capture apparatus 200 may be similar to the body 102 shown in FIGS. 1A-1B. The first image capture device 204 is structured on a front surface of the body 202. The first image capture device 204 includes a first element. The first image capture device 204 may be similar to the image capture device 104 shown in FIG. 1A. As shown in FIG. 2A, the image capture apparatus 200 includes the second image capture device 206 structured on a rear surface of the body 202. The second image capture device 206 includes a second element. The second image capture device 206 may be similar to the image capture device 104 shown in FIG. 1A. The image capture devices 204, 206 are disposed on opposing surfaces of the body 202, for example, in a back-to-back configuration, Janus configuration, or offset Janus configuration. The image capture apparatus 200 may include other image capture devices structured on respective surfaces of the body 202.

As shown in FIG. 2B, the image capture apparatus 200 includes the indicators 208 associated with the audio component 218 and the display 224 on the front surface of the body 202. The indicators 208 may be similar to the indicator 106 shown in FIG. 1A. For example, one of the indicators 208 may indicate a status of the first image capture device 204 and another one of the indicators 208 may indicate a status of the second image capture device 206. Although two indicators 208 are shown in FIGS. 2A-2B, the image capture apparatus 200 may include other indictors structured on respective surfaces of the body 202.

As shown in FIGS. 2A-2B, the image capture apparatus 200 includes input mechanisms including the mode button 210, structured on a side surface of the body 202, and the shutter button 212, structured on a top surface of the body 202. The mode button 210 may be similar to the mode button 110 shown in FIG. 1B. The shutter button 212 may be similar to the shutter button 112 shown in FIG. 1A.

The image capture apparatus 200 includes internal electronics (not expressly shown), such as imaging electronics, power electronics, and the like, internal to the body 202 for capturing images and performing other functions of the image capture apparatus 200. An example showing internal electronics is shown in FIG. 5.

As shown in FIGS. 2A-2B, the image capture apparatus 200 includes the interconnect mechanism 214 structured on a bottom surface of the body 202. The interconnect mechanism 214 may be similar to the interconnect mechanism 140 shown in FIG. 1B.

As shown in FIG. 2B, the image capture apparatus 200 includes the drainage channel 216 for draining liquid from audio components of the image capture apparatus 200.

As shown in FIGS. 2A-2B, the image capture apparatus 200 includes the audio components 218, 220, 222, respectively structured on respective surfaces of the body 202. The audio components 218, 220, 222 may be similar to the microphones 128, 130, 132 and the speaker 138 shown in FIGS. 1A-1B. One or more of the audio components 218, 220, 222 may be, or may include, audio sensors, such as microphones, to receive and record audio signals, such as voice commands or other audio, in conjunction with capturing images or video. One or more of the audio components 218, 220, 222 may be, or may include, an audio presentation component that may present, or play, audio, such as to provide notifications or alerts.

As shown in FIGS. 2A-2B, a first audio component 218 is located on a front surface of the body 202, a second audio component 220 is located on a top surface of the body 202, and a third audio component 222 is located on a back surface of the body 202. Other numbers and configurations for the audio components 218, 220, 222 may be used. For example, the audio component 218 may be a drain microphone surrounded by the drainage channel 216 and adjacent to one of the indicators 208 as shown in FIG. 2B.

As shown in FIG. 2B, the image capture apparatus 200 includes the display 224 structured on a front surface of the body 202. The display 224 may be similar to the displays 108, 142 shown in FIGS. 1A-1B. The display 224 may include an I/O interface. The display 224 may include one or more of the indicators 208. The display 224 may receive touch inputs. The display 224 may display image information during video capture. The display 224 may provide status information to a user, such as status information indicating battery power level, memory card capacity, time elapsed for a recorded video, etc. The image capture apparatus 200 may include multiple displays structured on respective surfaces of the body 202. In some implementations, the display 224 may be omitted or combined with another component of the image capture apparatus 200.

As shown in FIG. 2B, the image capture apparatus 200 includes the door 226 structured on, or forming a portion of, the side surface of the body 202. The door 226 may be similar to the door 114 shown in FIG. 1A. For example, the door 226 shown in FIG. 2A includes a release mechanism 228. The release mechanism 228 may include a latch, a button, or other mechanism configured to receive a user input that allows the door 226 to change position. The release mechanism 228 may be used to open the door 226 for a user to access a battery, a battery receptacle, an I/O interface, a memory card interface, etc.

In some embodiments, the image capture apparatus 200 may include features or components other than those described herein, some features or components described herein may be omitted, or some features or components described herein may be combined. For example, the image capture apparatus 200 may include additional interfaces or different interface features, interchangeable elements, cold shoes, or hot shoes.

Figure 3:
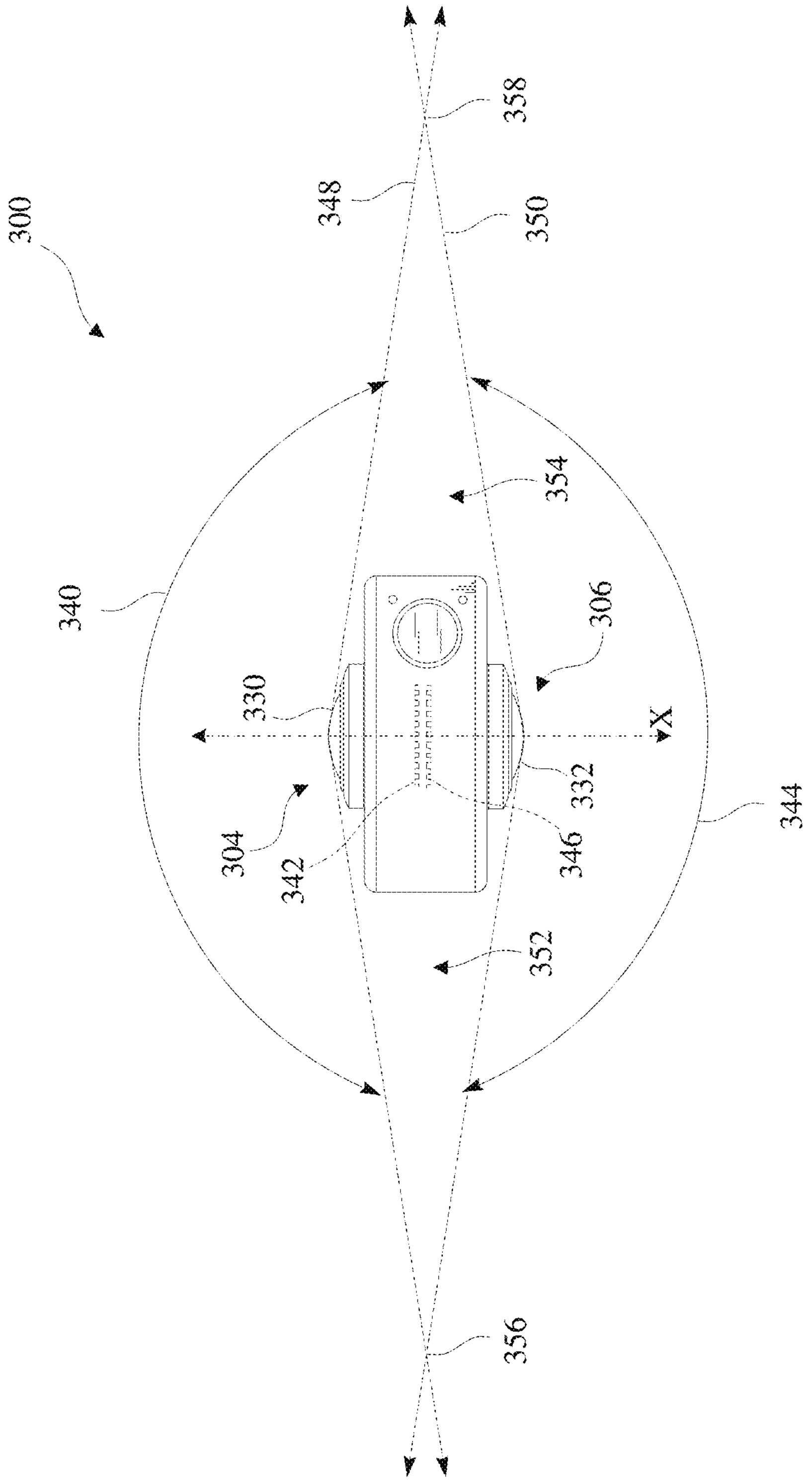
FIG. 3 is a top view of another example of an image capture apparatus.

FIG. 3 is a top view of an image capture apparatus 300. The image capture apparatus 300 is similar to the image capture apparatus 200 of FIGS. 2A-2B and is configured to capture spherical images.

As shown in FIG. 3, a first image capture device 304 includes a first element 330 (e.g., a fisheye lens and/or a cover) and a second image capture device 306 includes a second element 332 (e.g., a fisheye lens and/or a cover). For example, the first image capture device 304 may capture a first image, such as a first hemispheric, or hyper-hemispherical, image, the second image capture device 306 may capture a second image, such as a second hemispheric, or hyper-hemispherical, image, and the image capture apparatus 300 may generate a spherical image incorporating or combining the first image and the second image, which may be captured concurrently, or substantially concurrently.

The first image capture device 304 defines a first field-of-view 340 wherein the first element 330 of the first image capture device 304 receives light. The first element 330 directs the received light corresponding to the first field-of-view 340 onto a first image sensor 342 of the first image capture device 304. For example, the first image capture device 304 may include a first lens barrel (not expressly shown), extending from the first element 330 to the first image sensor 342.

The second image capture device 306 defines a second field-of-view 344 wherein the second element 332 receives light. The second element 332 directs the received light corresponding to the second field-of-view 344 onto a second image sensor 346 of the second image capture device 306. For example, the second image capture device 306 may include a second element barrel (not expressly shown), extending from the second element 332 to the second image sensor 346.

A boundary 348 of the first field-of-view 340 is shown using broken directional lines. A boundary 350 of the second field-of-view 344 is shown using broken directional lines. As shown, the image capture devices 304, 306 are arranged in a back-to-back (Janus) configuration such that the elements 330, 332 face in opposite directions, and such that the image capture apparatus 300 may capture spherical images. The first image sensor 342 captures a first hyper-hemispherical image plane from light entering the first element 330. The second image sensor 346 captures a second hyper-hemispherical image plane from light entering the second element 332.

As shown in FIG. 3, the fields-of-view 340, 344 partially overlap such that the combination of the fields-of-view 340, 344 forms a spherical field-of-view, except that one or more uncaptured areas 352, 354 may be outside of the fields-of-view 340, 344 of the elements 330, 332. Light emanating from or passing through the uncaptured areas 352, 354, which may be proximal to the image capture apparatus 300, may be obscured from the elements 330, 332 and the corresponding image sensors 342, 346, such that content corresponding to the uncaptured areas 352, 354 may be omitted from images captured by the image capture apparatus 300. In some implementations, the image capture devices 304, 306, or the elements 330, 332 thereof, may be configured to minimize the uncaptured areas 352, 354.

Examples of points of transition, or overlap points, from the uncaptured areas 352, 354 to the overlapping portions of the fields-of-view 340, 344 are shown at 356, 358.

Images contemporaneously captured by the respective image sensors 342, 346 may be combined to form a combined image, such as a spherical image. Generating a combined image may include correlating the overlapping regions captured by the respective image sensors 342, 346, aligning the captured fields-of-view 340, 344, and stitching the images together to form a cohesive combined image. Stitching the images together may include correlating the overlap points 356, 358 with respective locations in corresponding images captured by the image sensors 342, 346. Although a planar view of the fields-of-view 340, 344 is shown in FIG. 3, the fields-of-view 340, 344 are hyper-hemispherical.

A change in the alignment, such as position, tilt, or a combination thereof, of the image capture devices 304, 306, such as of the elements 330, 332, the image sensors 342, 346, or both, may change the relative positions of the respective fields-of-view 340, 344, may change the locations of the overlap points 356, 358, such as with respect to images captured by the image sensors 342, 346, and may change the uncaptured areas 352, 354, which may include changing the uncaptured areas 352, 354 unequally.

Incomplete or inaccurate information indicating the alignment of the image capture devices 304, 306, such as the locations of the overlap points 356, 358, may decrease the accuracy, efficiency, or both of generating a combined image. In some implementations, the image capture apparatus 300 may maintain information indicating the location and orientation of the image capture devices 304, 306, such as of the elements 330, 332, the image sensors 342, 346, or both, such that the fields-of-view 340, 344, the overlap points 356, 358, or both may be accurately determined, which may improve the accuracy, efficiency, or both of generating a combined image.

The elements 330, 332 may be aligned along an axis X as shown, laterally offset from each other (not shown), off-center from a central axis of the image capture apparatus 300 (not shown), or laterally offset and off-center from the central axis (not shown). Whether through use of offset or through use of compact image capture devices 304, 306, a reduction in distance between the elements 330, 332 along the axis X may improve the overlap in the fields-of-view 340, 344, such as by reducing the uncaptured areas 352, 354.

Images or frames captured by the image capture devices 304, 306 may be combined, merged, or stitched together to produce a combined image, such as a spherical or panoramic image, which may be an equirectangular planar image. In some implementations, generating a combined image may include use of techniques such as noise reduction, tone mapping, white balancing, or other image correction. In some implementations, pixels along a stitch boundary, which may correspond with the overlap points 356, 358, may be matched accurately to minimize boundary discontinuities.

Figure 4:
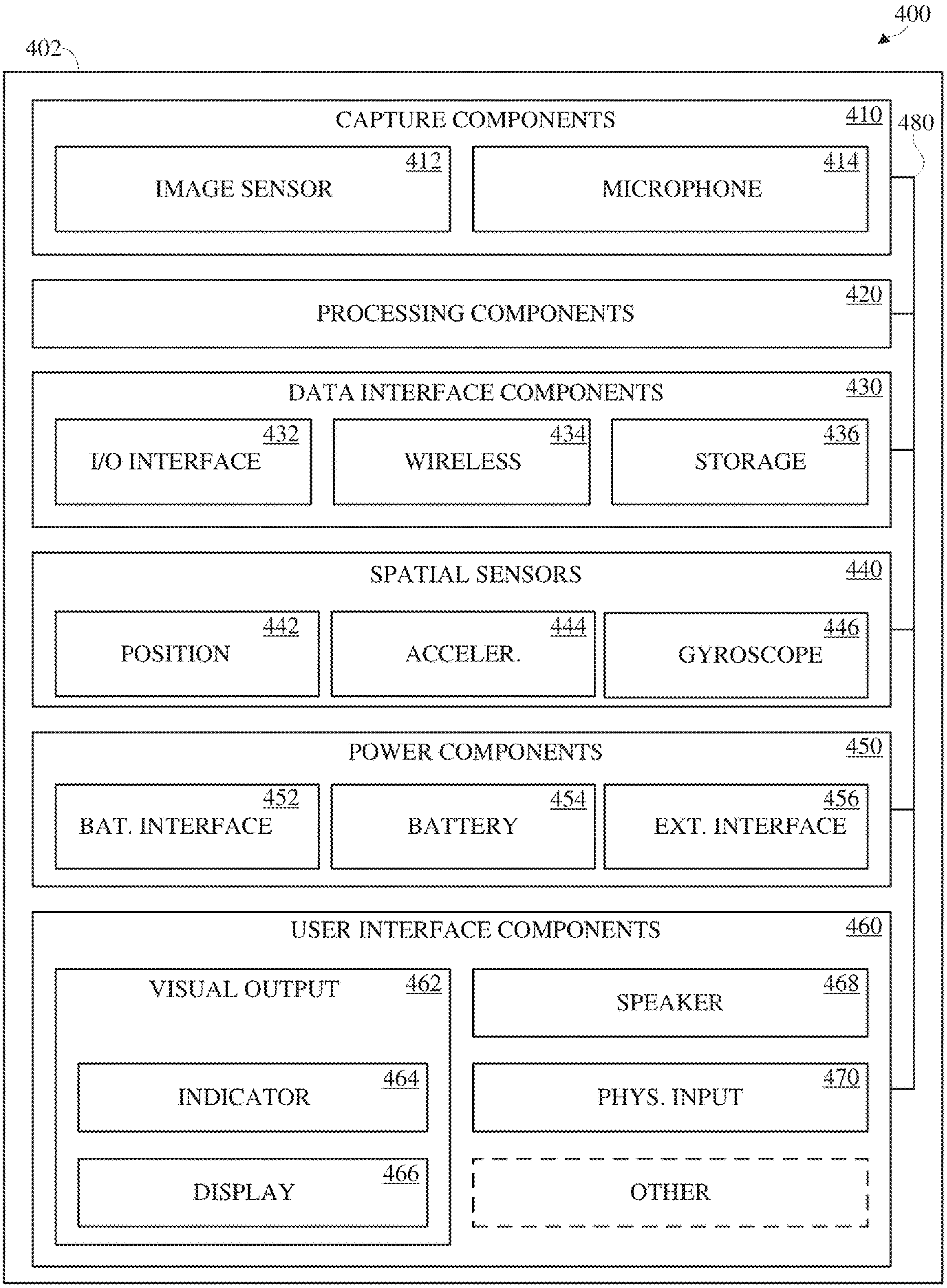
FIG. 4 is a block diagram of electronic components of an image capture apparatus.

FIG. 4 is a block diagram of electronic components in an image capture apparatus 400. The image capture apparatus 400 may be a single-element image capture device, a multi-element image capture device, or variations thereof, including an image capture apparatus with multiple capabilities such as the use of interchangeable integrated sensor lens assemblies. Components, such as electronic components, of the image capture apparatus 100 shown in FIGS. 1A-B, the image capture apparatus 200 shown in FIGS. 2A-B, or the image capture apparatus 300 shown in FIG. 3, may be implemented as shown in FIG. 4.

The image capture apparatus 400 includes a body 402. The body 402 may be similar to the body 102 shown in FIGS. 1A-1B or the body 202 shown in FIGS. 2A-2B, or the body 402 shown in FIGS. 4A-4B. The body 402 includes electronic components such as capture components 410, processing components 420, data interface components 430, spatial sensors 440, power components 450, user interface components 460, and a bus 480.

The capture components 410 include an image sensor 412 for capturing images. Although one image sensor 412 is shown in FIG. 4, the capture components 410 may include multiple image sensors. The image sensor 412 may be similar to the image sensors 342, 346 shown in FIG. 3. The image sensor 412 may be, for example, a charge-coupled device (CCD) sensor, an active pixel sensor (APS), a complementary metal-oxide-semiconductor (CMOS) sensor, or an N-type metal-oxide-semiconductor (NMOS) sensor. The image sensor 412 detects light, such as within a defined spectrum, such as the visible light spectrum or the infrared spectrum, incident through a corresponding element such as the first element 330 with respect to the first image sensor 342 or the second element 332 with respect to the second image sensor 346 as shown in FIG. 3. The image sensor 412 captures detected light as image data and conveys the captured image data as electrical signals (image signals or image data) to the other components of the image capture apparatus 400, such as to the processing components 420, such as via the bus 480.

The capture components 410 include a microphone 414 for capturing audio. Although one microphone 414 is shown in FIG. 4, the capture components 410 may include multiple microphones. The microphone 414 detects and captures, or records, sound, such as sound waves incident upon the microphone 414. The microphone 414 may detect, capture, or record sound in conjunction with capturing images by the image sensor 412. The microphone 414 may detect sound to receive audible commands to control the image capture apparatus 400. The microphone 414 may be similar to the microphones 128, 130, 132 shown in FIGS. 1A-1B or the audio components 218, 220, 222 shown in FIGS. 2A-2B.

The processing components 420 perform image signal processing, such as filtering, tone mapping, or stitching, to generate, or obtain, processed images, or processed image data, based on image data obtained from the image sensor 412. The processing components 420 may include one or more processors having single or multiple processing cores. In some implementations, the processing components 420 may include, or may be, an application specific integrated circuit (ASIC) or a digital signal processor (DSP). For example, the processing components 420 may include a custom image signal processor. The processing components 420 conveys data, such as processed image data, with other components of the image capture apparatus 400 via the bus 480. In some implementations, the processing components 420 may include an encoder, such as an image or video encoder that may encode, decode, or both, the image data, such as for compression coding, transcoding, or a combination thereof.

Although not shown expressly in FIG. 4, the processing components 420 may include memory, such as a random-access memory (RAM) device, which may be non-transitory computer-readable memory. The memory of the processing components 420 may include executable instructions and data that can be accessed by the processing components 420.

The data interface components 430 communicates with other, such as external, electronic devices, such as a remote control, a smartphone, a tablet computer, a laptop computer, a desktop computer, or an external computer storage device. For example, the data interface components 430 may receive commands to operate the image capture apparatus 400. In another example, the data interface components 430 may transmit image data to transfer the image data to other electronic devices. The data interface components 430 may be configured for wired communication, wireless communication, or both. As shown, the data interface components 430 include an I/O interface 432, a wireless data interface 434, and a storage interface 436. In some implementations, one or more of the I/O interface 432, the wireless data interface 434, or the storage interface 436 may be omitted or combined.

The I/O interface 432 may send, receive, or both, wired electronic communications signals. For example, the I/O interface 432 may be a universal serial bus (USB) interface, such as USB type-C interface, a high-definition multimedia interface (HDMI), a FireWire interface, a digital video interface link, a display port interface link, a Video Electronics Standards Associated (VESA) digital display interface link, an Ethernet link, or a Thunderbolt link. Although one I/O interface 432 is shown in FIG. 4, the data interface components 430 include multiple I/O interfaces. The I/O interface 432 may be similar to the data interface 124 shown in FIG. 1B.

The wireless data interface 434 may send, receive, or both, wireless electronic communications signals. The wireless data interface 434 may be a Bluetooth interface, a ZigBee interface, a Wi-Fi interface, an infrared link, a cellular link, a near field communications (NFC) link, or an Advanced Network Technology interoperability (ANT+) link. Although one wireless data interface 434 is shown in FIG. 4, the data interface components 430 include multiple wireless data interfaces. The wireless data interface 434 may be similar to the data interface 124 shown in FIG. 1B.

The storage interface 436 may include a memory card connector, such as a memory card receptacle, configured to receive and operatively couple to a removable storage device, such as a memory card, and to transfer, such as read, write, or both, data between the image capture apparatus 400 and the memory card, such as for storing images, recorded audio, or both captured by the image capture apparatus 400 on the memory card. Although one storage interface 436 is shown in FIG. 4, the data interface components 430 include multiple storage interfaces. The storage interface 436 may be similar to the data interface 124 shown in FIG. 1B.

The spatial, or spatiotemporal, sensors 440 detect the spatial position, movement, or both, of the image capture apparatus 400. As shown in FIG. 4, the spatial sensors 440 include a position sensor 442, an accelerometer 444, and a gyroscope 446. The position sensor 442, which may be a global positioning system (GPS) sensor, may determine a geospatial position of the image capture apparatus 400, which may include obtaining, such as by receiving, temporal data, such as via a GPS signal. The accelerometer 444, which may be a three-axis accelerometer, may measure linear motion, linear acceleration, or both of the image capture apparatus 400. The gyroscope 446, which may be a three-axis gyroscope, may measure rotational motion, such as a rate of rotation, of the image capture apparatus 400. In some implementations, the spatial sensors 440 may include other types of spatial sensors. In some implementations, one or more of the position sensor 442, the accelerometer 444, and the gyroscope 446 may be omitted or combined.

The power components 450 distribute electrical power to the components of the image capture apparatus 400 for operating the image capture apparatus 400. As shown in FIG. 4, the power components 450 include a battery interface 452, a battery 454, and an external power interface 456 (ext. interface). The battery interface 452 (bat. interface) operatively couples to the battery 454, such as via conductive contacts to transfer power from the battery 454 to the other electronic components of the image capture apparatus 400. The battery interface 452 may be similar to the battery receptacle 126 shown in FIG. 1B. The external power interface 456 obtains or receives power from an external source, such as a wall plug or external battery, and distributes the power to the components of the image capture apparatus 400, which may include distributing power to the battery 454 via the battery interface 452 to charge the battery 454. Although one battery interface 452, one battery 454, and one external power interface 456 are shown in FIG. 4, any number of battery interfaces, batteries, and external power interfaces may be used. In some implementations, one or more of the battery interface 452, the battery 454, and the external power interface 456 may be omitted or combined. For example, in some implementations, the external interface 456 and the I/O interface 432 may be combined.

The user interface components 460 receive input, such as user input, from a user of the image capture apparatus 400, output, such as display or present, information to a user, or both receive input and output information, such as in accordance with user interaction with the image capture apparatus 400.

As shown in FIG. 4, the user interface components 460 include visual output components 462 to visually communicate information, such as to present captured images. As shown, the visual output components 462 include an indicator 464 and a display 466. The indicator 464 may be similar to the indicator 106 shown in FIG. 1A or the indicators 208 shown in FIGS. 2A-2B. The display 466 may be similar to the display 108 shown in FIG. 1A, the display 142 shown in FIG. 1B or the display 224 shown in FIG. 2B. Although the visual output components 462 are shown in FIG. 4 as including one indicator 464, the visual output components 462 may include multiple indicators. Although the visual output components 462 are shown in FIG. 4 as including one display 466, the visual output components 462 may include multiple displays. In some implementations, one or more of the indicator 464 or the display 466 may be omitted or combined.

As shown in FIG. 4, the user interface components 460 include a speaker 468. The speaker 468 may be similar to the speaker 138 shown in FIG. 1B or the audio components 218, 220, 222 shown in FIGS. 2A-2B. Although one speaker 468 is shown in FIG. 4, the user interface components 460 may include multiple speakers. In some implementations, the speaker 468 may be omitted or combined with another component of the image capture apparatus 400, such as the microphone 414.

As shown in FIG. 4, the user interface components 460 include a physical input interface 470. The physical input interface 470 may be similar to the mode buttons 110, 210, 410 shown in FIGS. 1A and 2A or the shutter buttons 112 and 212 shown in FIGS. 1A and 2B. Although one physical input interface 470 is shown in FIG. 4, the user interface components 460 may include multiple physical input interfaces. In some implementations, the physical input interface 470 may be omitted or combined with another component of the image capture apparatus 400. The physical input interface 470 may be, for example, a button, a toggle, a switch, a dial, or a slider.

As shown in FIG. 4, the user interface components 460 include a broken line border box labeled "other" to indicate that components of the image capture apparatus 400 other than the components expressly shown as included in the user interface components 460 may be user interface components. For example, the microphone 414 may receive, or capture, and process audio signals to obtain input data, such as user input data corresponding to voice commands. In another example, the image sensor 412 may receive, or capture, and process image data to obtain input data, such as user input data corresponding to visible gesture commands. In another example, one or more of the spatial sensors 440, such as a combination of the accelerometer 444 and the gyroscope 446, may receive, or capture, and process motion data to obtain input data, such as user input data corresponding to motion gesture commands.

Figure 5A:
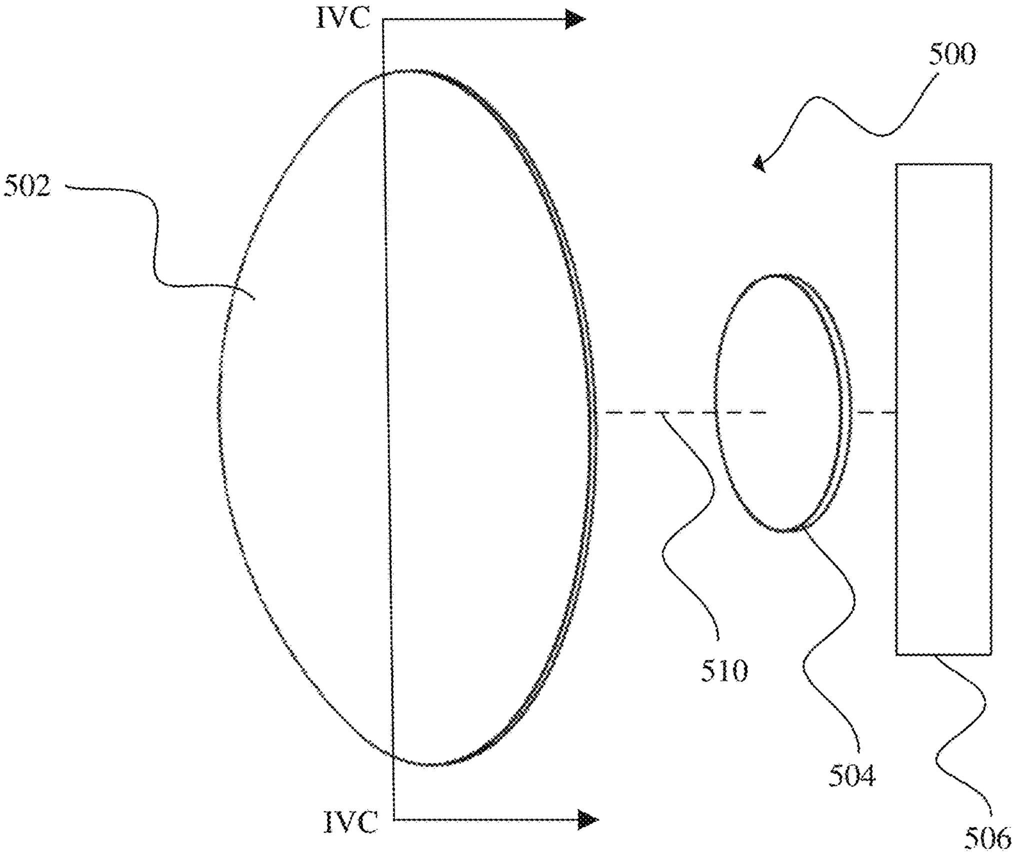
FIG. 5A is an isometric view of an element cover over a portion of a lens assembly.

FIG. 5A is a front isometric view of a representative lens assembly 500 of an image capture apparatus 100, 200, 300, 400 of FIGS. 1A-4. The lens assembly 500 includes multiple elements axially aligned relative to one another so that light is guided through the lens assembly 500. The lens assembly 500 may include two or more, three or more, four or more, five or more, or even six or more elements. The lens assembly 500 is covered by a forward element 502.

The forward element 502 may be part of the lens assembly 500. The forward element 502 may refract light, bend light, guide light at a predetermined angle, or a combination thereof. Stated another way, without the forward element 502 being present, a path of light through the lens assembly 500 may be different than when the forward element 502 is present. The forward element 502 may assist in focusing light that extends into the lens assembly 500. The forward element 502 may direct light into a second element (or a beginning element of the lens assembly 500). The forward element 502 may direct light inwardly into the lens assembly 500. The forward element 502 may be domed, hemispherical, a half circle, a continuous radius, a varied radius, or a combination thereof. The forward element 502 may have a shape so that the lens assembly 500 (e.g., a series of elements) has a field of view of about 165 degrees or more, about 180 degrees or more, 205 degrees or more, or about 225 degrees or more. The forward element 502 may have a shape so that the lens assembly 500 has a field of view of about 300 degrees or less, about 275 degrees or less, about 250 degrees or less, or about 230 degrees or less. The forward element 502 may be free of any planar surface, any flat portions that receive light, or both. The forward element 502 may both cover the lens assembly 500 and form an optical portion of the lens assembly 500.

The forward element 502 may be removable. The forward element 502 may protect the other elements in the lens assembly 500. The forward element 502 may include or be made of glass, plastic, acrylic, nylon, polycarbonate, polystyrene, poly methyl methacrylate, polyethylene terephthalate, ceramic, or a combination thereof. The forward element 502 may be made of an aluminosilicate that is bathed in a potassium salt. The forward element 502 may be an alkali-aluminosilicate that is bathed in a salt. The forward element 502 may be made of an alkaline earth boro-aluminosilicate glass. The forward element 502 may be made of an alkali-free borosilicate. The forward element 502 may be made of or include silicon dioxide, aluminum, magnesium, and sodium. The forward element 502 may be coated, soaked in a fluid, heated, dipped, or a combination thereof. The forward element 502 may be a low refractive index glass. The forward element 502 may be subjected to ion-exchange. The forward element 502 may be made of a material that is scratch-resistant, crack-resistant or both. The forward element 502 may have a Vickers hardness rating of 600 or more, 625 or more, 650 or more, 675 or more, 700 or more, or 725 or less. The forward element 502 may be made of a same material as one or more of the elements of the lens assembly 500. The forward element 502 may be made of a same material as all of the elements of the lens assembly 500.

The forward element 502 may begin the lens assembly 500 and an end element 504 may end the lens assembly 500. The end element 504 may terminate the lens assembly 500. The end element 504 may be a last element of the lens assembly 500 before a sensor assembly 506. The end element 504 may direct or guide light into the sensor assembly 506. The end element 504 may spread light or focus light on the sensor assembly 506 so that images or videos may be captured.

The sensor assembly 506 may detect images or videos by capturing the light focused on the sensor assembly 506. The sensor assembly 506 may be connected to the lens assembly 500 so that the sensor assembly 506 and the lens assembly 500 are integrated as an integrated sensor and lens assembly (ISLA). The sensor assembly 506 and the lens assembly 500 may be aligned along an optical axis 510.

The optical axis 510 may extend through a center of the lens assembly 500. The optical axis 510 may be a direction the light is extended. The optical axis 510 may align with a center of the forward element 502 and a center of (e.g., a central region) the sensor assembly 506. The forward element 502 may assist in guiding light along the optical axis 510 such that the forward element 502 optically changes light, directs light, refracts light, changes an angle of the light, or a combination thereof. Thus, the forward element 502 may both protect the lens assembly 500 and direct light along the optical axis 510 of the lens assembly 500.

Figure 5B:
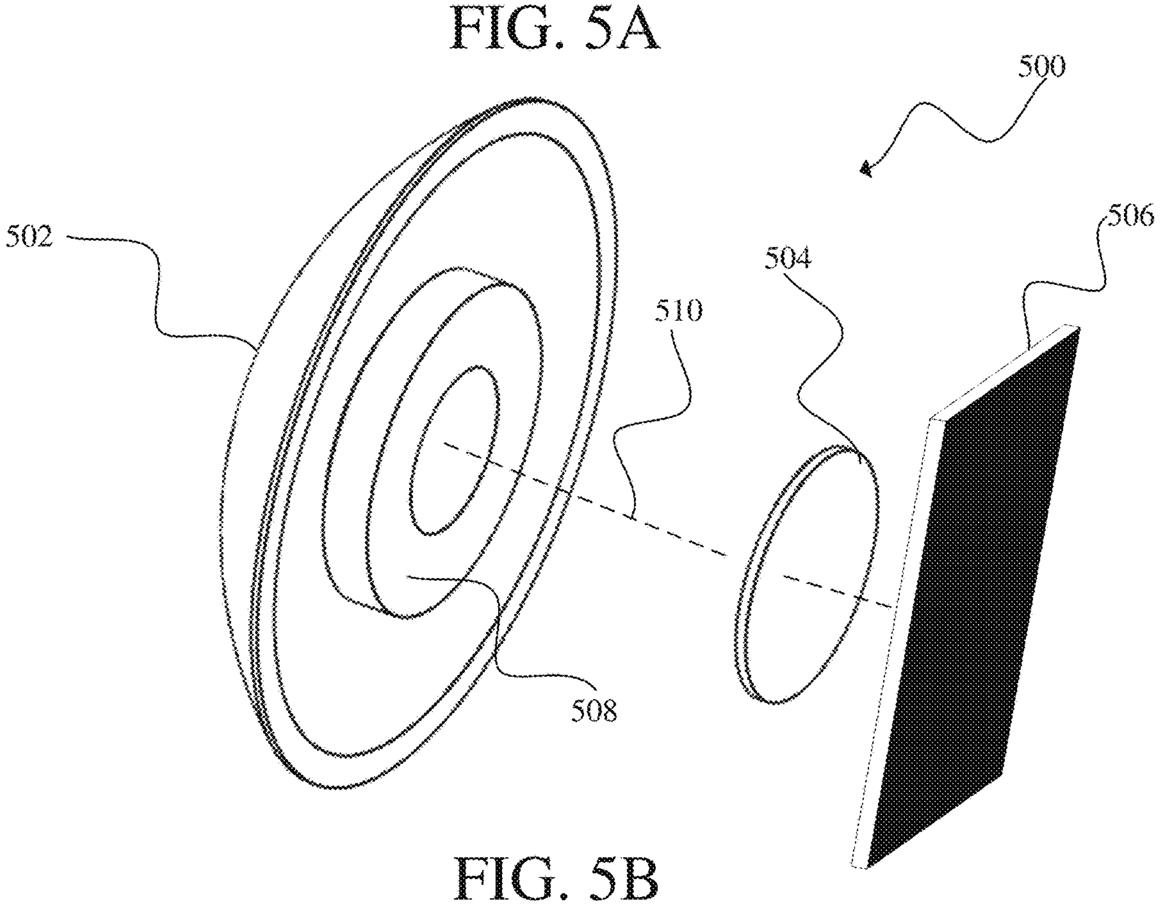
FIG. 5B is a rear isometric view of the lens assembly of FIG. 5A.

FIG. 5B is a rear isometric view of the lens assembly 500 of FIG. 5A. As shown, the forward element 502 directly covers a beginning element 508 (e.g., a second element of the lens assembly 500). The beginning element 508 may mirror a shape of the forward element 502. The beginning element 508 may guide light in substantially a same direction (e.g., within about 5 degrees or less, about 3 degrees or less, or about 1 degree or less) as the forward element 502. The beginning element 508 may direct the light towards the optical axis 510 so that the light is directed to the end element 504 and the sensor assembly 506. Thus, light extends through the forward element 502 into the beginning element 508, along the optical axis 510 through other elements (not shown), through the end element 504 and into the sensor assembly 506 so that images, videos or both are detected by the sensor assembly 506.

Figure 5C:
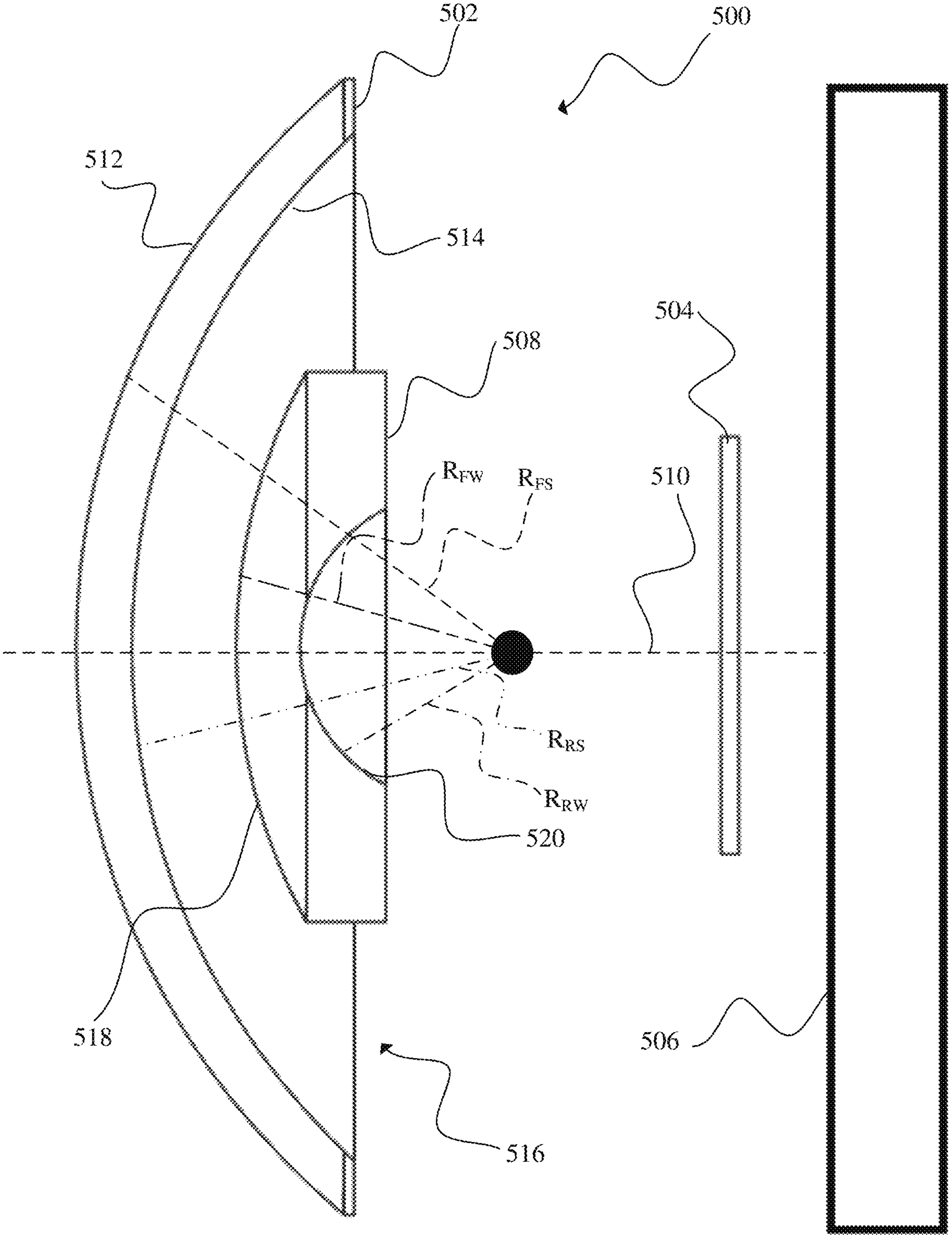
FIG. 5C is a cross-sectional view of the lens assembly of FIG. 5A along line IVC-IVC.

FIG. 5C is a cross-sectional view of FIG. 5A along line IVC-IVC. The lens assembly 500 includes the forward element 502 (e.g., first element) covering the beginning element 508 (e.g., second element) and terminating at the end element 504 (e.g., the last element of the lens assembly 500). The sensor assembly 506 is located after the end element 504 and aligned with the lens assembly 500 along the optical axis 510. The forward element 502 may guide light towards or along the optical axis 510. The forward element 502 may collimate light parallel towards the optical axis 510.

The forward element 502 includes a front side 512 and a rear side 514 with a thickness therebetween. The front side 512 may form the outermost portion of the forward element 502. The front side 512 may have an arcuate shape, a dome shape, a partially circular shape, or a combination thereof. The front side may have a radius of curvature ($R_{FS}$). The radius of curvature ($R_{FS}$) may be continuous. The radius of curvature ($R_{FS}$) may be constant from a first terminal end to a second terminal end of the forward element 502, as shown in FIG. 5C. The front side 512 of the forward element 502 and the rear side 514 of the forward element 502 may be generally parallel.

The front side 512 and the rear side 514 may have a thickness that extends therebetween. The rear side 514 may have an arcuate shape, a dome shape, a partially circular shape, or a combination thereof. The front side 512 and the rear side 514 may have a same radius with a radius of curvature ($R_{RS}$). The radius of curvature ($R_{RS}$) may be continuous. The radius of curvature ($R_{RS}$) may be constant from the first terminal end to the second terminal end of the forward element 502, as shown in FIG. 5C. The rear side 514 may be located proximate to a gap 516. The rear side 514 may be spaced apart from the beginning element 508 by the gap 516.

The gap 516 may be substantially small so that light is substantially free of refraction, angle change, or both (e.g., 5 degrees or less, 3 degrees or less, or 1 degree or less). The gap 516 may be an air gap. The gap 516 may about 3 mm or less, about 2 mm or less, about 1 mm or less, about 0.5 mm or less, or about 0.1 mm or more. The gap 516 allow light to pass from the rear side 514 of the forward element 502 to a front wall 518 of the beginning element 508 (e.g., second element).

The front wall 518 of the beginning element 508 functions to guide light from the forward element 502 towards the optical axis 510. The front wall 518 may extend parallel to the front side 512, the rear side 514, or both. The front wall 518 may have an arcuate shape, a dome shape, a partially circular shape, or a combination thereof. The front wall 518 may have a same center of curvature as the front side 512, the rear side 514, or both. The front side 512, the rear side 514, and the front wall 518 may all be concentric. The front wall 518 has a radius of curvature ($R_{FW}$). The radius of curvature ($R_{FW}$) may change an angle of light so that the light extends directly into the beginning element 508 at an angle towards the optical axis 510. The radius of curvature ($R_{FW}$) may be such that light continues at a generally continuous angle or direction from entering the front side 512 of the forward element 502 when extending into the front wall 518 of the beginning element 508. The front wall 518 of the beginning element 508 may have a different radius and/or shape as a rear wall 520 of the beginning element 508.

The rear wall 520 may have a curvature so that light exiting the rear wall changes direction and extends towards the optical axis 510. The rear wall 520 may not be parallel to the front side 512, the rear side 514, the front wall 518, or a combination thereof. The rear wall 520 may curve so that the rear wall 520 has a generally circular shape. A portion of the rear wall 520 may be planar. The rear wall 520 may have a hemispherical portion and a planar portion. A hemispherical portion of the rear wall 520 may be centered along the optical axis 510. The rear wall 520 may have a curvature so that light exiting the rear wall 520 changes angle by about 1 degree or more, about 3 degrees or more, about 5 degrees or more, or about 10 degrees or more. The rear wall 520 may have a curvature so that light exiting the rear wall 520 changes by an angle of about 60 degrees or less, about 45 degrees or less, about 30 degrees or less, or about 15 degrees or less. Substantially all of the angle change of the light occurs as the light exits the rear wall 520. The light from the rear wall 520 may change an angle of the light so that the light maintains a parallel orientation from the rear wall 520 into a third element of the lens assembly 500. The rear wall 520 may be concave, curved, a dome, or a combination thereof. The rear wall 520 may have a radius of curvature ($R_{RW}$).

The radius of curvature ($R_{RW}$) may be dimensionally smaller than the radius of curvature of the radius front side ($R_{FS}$), radius rear side ($R_{RS}$), and radius front wall ($R_{FW}$). The radius of curvature ($R_{RW}$) may be concentric with the radius of curvature of the radius front side ($R_{FS}$), radius rear side ($R_{RS}$), and radius front wall ($R_{FW}$). The radius of curvature of the functions to determine how the light extends through the lens assembly 500. The elements having similar or the same radius of curvature may cause light to extend through the elements with the same radius of curvature at a constant angle. A focal point or center of the curvature of curvature may vary how the light extends through the lens assembly 500. Some or all of the light may extend through the optical elements of the lens assembly and through the focal point. Some or all of the light may extend across the optical axis as the light passes through the optical axis. As show the radius of curvature vary but a center of the curvature are all the same so that light is focused to a predetermined area. The forward element 502 has radii of curvature ($R_{FS}$) ($R_{RS}$) are substantially large so that the forward element 502 covers the lens assembly 500 and allows a field of view of about 180 degrees or more.

Figure 6A:
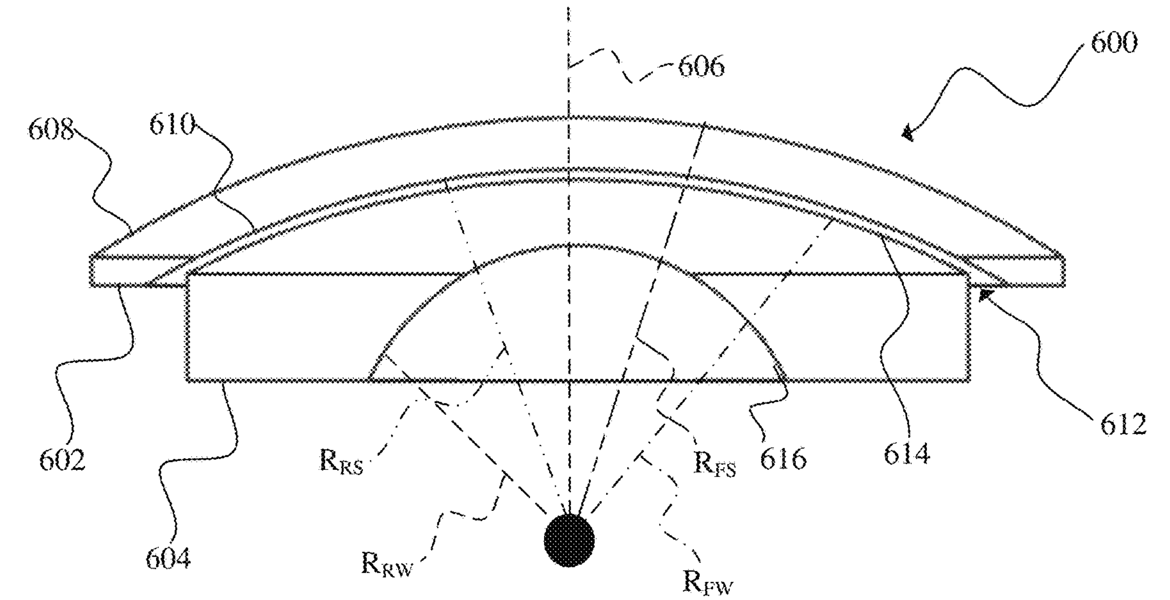
FIG. 6A is a cross-sectional view of an element and a portion of a lens assembly.

FIG. 6A is a cross-sectional view of a lens assembly 600 that includes a plurality of elements. The lens assembly 600 aligns light with a sensor assembly (not shown) so that images and/or videos may be captured. The lens assembly 600 includes a forward element 602 and a beginning element 604.

The forward element 602 and the beginning element 604 are configured to act in conjunction to guide light though the lens assembly 600. The forward element 602 and the beginning element 604 are aligned along an optical axis 606. The forward element 602 and the beginning element 604 direct light towards the optical axis 606, in a parallel direction, in a substantially unrefracted manner. The forward element 602 may be removable, made of glass, made of any of the materials discussed herein, or a combination thereof. The forward element 602 includes a front side 608 and a rear side 610.

The front side 608 is generally arcuate and has a center of curvature. The front side 608 has a radius front side ($R_{FS}$). The front side 608 extends parallel to a rear side 610 of the forward element 602. The rear side 610 has a radius rear side ($R_{RS}$). The radius front side ($R_{FS}$) and the radius rear side ($R_{RS}$) may be concentric. The radius front side ($R_{FS}$) and the radius rear side ($R_{RS}$) may extend parallel to on another. The radius front side ($R_{FS}$) and the radius rear side ($R_{RS}$) may be configured so that light extends in a generally straight line as the light extends from the front side 608 to the rear side 610. Thus, for example, the forward element 602 itself does not change a direction of the light as the light extends through the forward element 602. The rear side 610 may be located directly adjacent to a gap 612.

The gap 612 functions to space the forward element 602 and the beginning element 604 from one another so that the forward element 602 protects the beginning element 604. The gap 612 may be sufficiently large so that if a drop occurs and the forward element 602 is contacted the forward element 602 does not contact the beginning element 604. The gap 612 may be sufficiently small so that light extending through the gap 612 is sufficiently unchanged (e.g., refraction does not occur, the light changes by an angle of about 3 degrees or less, about 2 degrees or less, or about 1 degree or less). The gap 612 may be about 0.1 mm or more, about 0.5 mm or more, or about 1 mm or more. The gap 612 may be about 5 mm or less, about 4 mm or less, about 3 mm or less, or about 2 mm or less. The gap 612 may have the rear side 610 on a first side and a front wall 614 of the beginning element 604 on a second side.

The front wall 614 function to receive light and direct the light through the beginning element 604. The front wall 614 may be concentric with the front side 608, the rear side 610, or both of the forward element 602. The front wall 614 may generally arcuate. The front wall 614 may maintain the light on a path (e.g., the light may not refract or change angles). The front wall 614 may have a radius front wall ($R_{FW}$). The radius front wall ($R_{FW}$) may be smaller than the radius front side ($R_{FS}$) and the radius rear side ($R_{RS}$). The front wall 614 is located opposite the rear wall 616.

The rear wall 616 functions to direct light towards the optical axis 606. The rear wall 616 may refract the light, change an angle of the light, or both. The rear wall 616 has a radius rear wall ($R_{RW}$). The radius rear wall ($R_{RW}$) is a smallest radius of the radius front wall ($R_{FW}$), the radius front side ($R_{FS}$), and the radius rear side ($R_{RS}$). The rear wall 616 may be arcuate, curved, hemispherical, a hemispherical portion and planar portions, or a combination thereof. The rear wall 616 may be concentric with the front side 608, the rear side 610, the front wall 614, or a combination thereof.

Figure 6B:
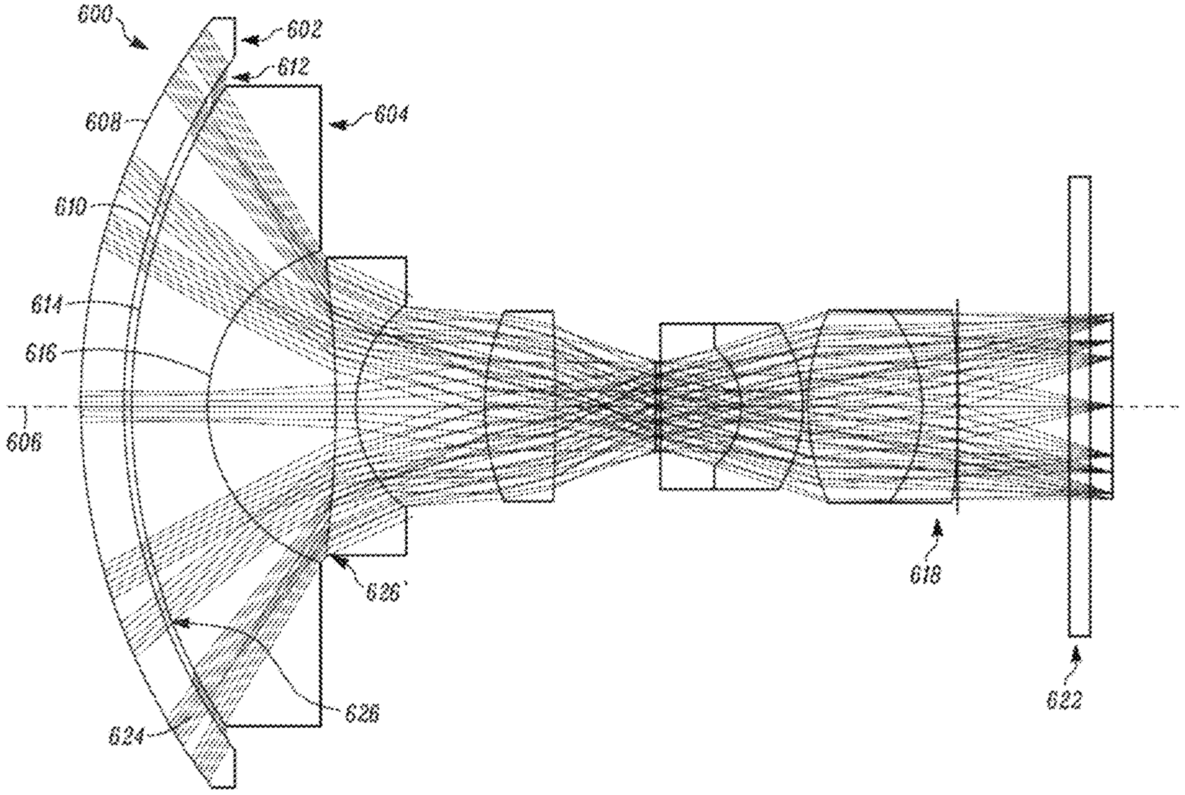
FIG. 6B is the element and an entire lens assembly.

FIG. 6B illustrates a cross-sectional view of a complete lens assembly 600. As shown, the lens assembly 600 includes seven elements, but the lens assembly 600 may have more or less elements. The lens assembly 600 includes the forward element 602, the beginning element 604, and an end element 618 that terminated the lens assembly 600. The end element 618 is located forward of a sensor assembly 622. The forward element 602 and the beginning element 604 are aligned along the optical axis 606.

The forward element 602 includes a front side 608 and a rear side 610. The front side 608 and the rear side 610 are generally parallel to one another so that light 624 extending through the forward element 602 is generally unreacted or free of an angle change 626. For example, the light 624 enters the front side 608 at substantially a same angle as the light 624 exits the rear side 610 (e.g., within about 5 degrees or less, about 3 degrees or less, or about 1 degree or less). The forward element 602 provides some optics to assist in guiding the light to the sensor assembly 622. The forward element 602 may be part of the optics and when a new forward element 602 is provided re-calibration is not needed. The optical power and/or optics of the forward element 602 may be that the light continues along a parallel path towards the optical axis 606. The forward element 602 provides optical power and/or optics so that the forward element 602 provides modulation transfer function, provides relative illumination, maintains a chief ray angle, alters focus of the image capture device, or a combination thereof. The light 624 may extend out of the rear side 610, through the gap 612, and into the front wall 614 of the beginning element 604.

The optical power and/or optics of the forward element 602 may not change from forward element 602 to forward element 602 (e.g., a replacement forward element). The optics from a first of the forward lens 602 to a second of the forward lens 602 may be measured by comparing just noticeable differences (JND). The JND of a first of the forward lens 602 to a second of the forward lens 602 may be 10 or less, 7 or less, 5 or less, 3 or less, or 1 or less out of a scale of 1 to 100 (e.g., 1 being the least change and 100 being the most change) when an image taken through the first of the forward lens 602 is compared to an image taken through the second of the forward lens. The JND may be substantially unchanged to a naked eye when two images are viewed. The JND, optics, or both may comprise: chromatic aberration, image sharpness, optical distortion, relative illumination, intensity, angle of refraction, or a combination thereof.

The optics of the forward lens 602 may include chromatic aberration. The chromatic aberration may be a measure of color errors in an image. The chromatic aberration may comprise or compare an amount of defocus, spherical aberration, coma, astigmatism, field curvature, image distortion, or a combination thereof. The chromatic aberration may vary from the first forward lens 602 to the second forward lens 602 (e.g., replacement lens) by about 10 percent or less, 7 percent or less, 5 percent or less, 3 percent or less, or 1 percent or less from image to image. The chromatic aberration may change the optics of the light passing through the first forward lens 602 to the second forward lens 602, relative to the optical axis, by about 10 percent or less, 7 percent or less, 5 percent or less, 3 percent or less, or 1 percent or less.

The optics may be measured by comparing image sharpness of two images taken with different forward lenses 602. Image sharpness may be measured using modulation transfer function (MTF). The MTF from image to image may be substantially identical. The image sharpness from image to image may have substantially identical resolution, contrast, modulation, or a combination thereof. The image sharpness from an image taken through the first forward lens 602 may not be discernible from the second forward lens 602 with the naked eye. The image sharpness may compare the pixels of a first image to a second image and the pixels may be substantially identical from the first image to the second image.

The optics may compare optical distortion from image to image. The optical distortion may be substantially identical from image to image. For example, a naked eye cannot see differences from image to image. The optical distortion from image to image may have a same barrel distortion, pincushion distortion, mustache distortion, or a combination thereof. Stated another way, the first forward lens 602 and the second forward lens 602 may have a same optical distortion so that the images are distorted a same amount (e.g., are identical). In another example, when the second forward lens 602 replaces the first forward lens 602 the optics are substantially the same without recalibrating the system.

The optics may include relative illumination. The relative illumination may be a measure of light intensity from a center of an image to an edge of the image. The relative illumination may measure lens shading of two images. The relative illumination may be a combination of vignetting and roll-off. The relative illumination from image to image may vary by 10 percent or less, 7 percent or less, 5 percent or less, 3 percent or less, or 1 percent or less. The relative illumination may be substantially consistent (e.g., within about 2% illumination or less) from edge to edge, center to edge, or both.

The optics may have a consistent intensity from image to image. The intensity may be an amount of light recorded on image to image. The intensity of light may be an amount of light spots, an amount of dark spots, or both. The intensity of light may measured by comparing a first image to a second image for light changes that result in light spots or dark spots captured in the images. Thus, the first forward element 602 and the second forward element 602 may direct light therethrough so that an intensity of light captures from image to image is identical.

The optics may include an angle of refraction. The angle of refraction from the first forward element 602 and the second forward element 602 may be the same. The angle of refraction from the first forward element 602 to the second forward element 602 may change an angle of light extending therethrough by about 10 degrees or less, 7 degrees, or less, 5 degrees or less, 3 degrees or less, or 1 degree or less. Thus, the light extending through the first forward element 602 may bend substantially identically to the light extending through the second forward element 602.

The light 624 may extend into the beginning element 604 at a substantially continuous angle or direction. The light 624 may be generally free of refraction or angle changes as the light 624 extends through the front wall 614 and through the body of the beginning element 604. The light 624 may be generally free of refraction or angle changes 626' (e.g., a direction change of about 3 degrees or less, about 2 degrees or less, or about 1 degree or less) as the light extends out of the rear wall 616 of the beginning element.

The light 624 may be directed generally towards the optical axis 606. The light 624 may extend through the forward element 602 and the beginning element 604 in a generally parallel direction. Stated another way, the light 624 may all be directed in generally straight lines so that the light is free of mixing or crossing. The light 624 is directed through the forward element 602 and the beginning element 604 so that the light 624 when directed into the remaining elements of the lens assembly 600 directs the light to the sensor assembly 622.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device comprising:

a series of elements aligned along an optical axis, the series of elements having a field of view of about 180 degrees or more, wherein the series of elements comprise:

a forward element made of glass that removably forms a cover of the series of elements and provides optical power to the series of elements, wherein the forward element has a rear side, a first element, wherein the first element is curved and has a front side; and a gap between the rear side of the forward element and the front side of the first element that is substantially small so that light passing from the forward element into the first element is substantially free of refraction, angle change, or both;

wherein the rear side of the forward element and the front side of the first element are parallel;

wherein the forward element is curved and configured to capture the field of view of about 180 degrees or more, and wherein when the forward element is replaced by a replacement forward element, optics of the image capture device are substantially unchanged; and a sensor assembly located on the optical axis.

2. The image capture device of claim 1, wherein the optics comprise: chromatic aberration, image sharpness, optical distortion, relative illumination, intensity, angle of refraction, or a combination thereof.

3. The image capture device of claim 1, wherein the optics comprise a just noticeable difference of 1 or less when comparing an image taken with the forward element and a replacement image taken with the replacement forward element.

4. The image capture device of claim 1, wherein the first element of the series of elements is located directly behind the forward element.

5. The image capture device of claim 4, wherein the gap has a distance of about 3 mm or less.

6. The image capture device of claim 1, wherein the optics are substantially unchanged without recalibration of the image capture device when the forward element is replaced by the replacement forward element.

7. An image capture device comprising:

a series of elements aligned along an optical axis, the series of elements having a field of view of about 180 degrees or more and including a first element having a forward side with a first radius of curvature;

a second element that removably covers the series of elements, wherein the second element is curved so that the series of elements can capture the field of view of about 180 degrees or more through the second element, the second element comprising:

a front side with a front radius of curvature; and a rear side with a rear radius of curvature, wherein the first radius of curvature, the front radius of curvature, and the rear radius of curvature are all concentric;

a sensor assembly located on the optical axis; and a gap between the rear side of the second element and the front side of the first element that is sufficiently small so that light passing between the first element into the second element is substantially free of refraction or angle change;

wherein the rear side of the second element and the front side of the first element are parallel.

8. The image capture device of claim 7, wherein the second element is made of an alkaline earth boro-alumino-silicate glass.

9. The image capture device of claim 7, wherein the second element has a Vickers hardness rating of 600 or more.

10. The image capture device of claim 9, wherein a gap is located between the forward side of the first element and the rear side of the second element.

11. The image capture device of claim 10, wherein the gap is substantially small so that light passing from the second element into the first element is substantially free of refraction, angle change, or both.

12. The image capture device of claim 7, wherein the first element includes a rear side with a second radius of curvature that is concentric with the first radius of curvature, the front radius of curvature, and the rear radius of curvature.

13. The image capture device of claim 7, wherein the second element has a continuous radius between the front side and the rear side.

14. An image capture device comprising:

a series of elements aligned along an optical axis, the series of elements having a field of view of about 205 degrees or more;

a forward element that removably covers the series of elements, wherein the forward element includes a front side and a rear side, and wherein the forward element is made of glass and provides optical power to the series of elements;

a first element located on a rear side of the forward element and that covers the series of elements, wherein the first element has a curvature and a front side; and a gap between the rear side of the forward element and the front side of the first element of the series of elements that is substantially small so that light passing from the forward element into the first element is substantially free of refraction or angle change, wherein the rear side of the forward element and the front side of the first element are parallel;

wherein the forward element includes a curvature so that the series of elements capture the field of view of about 205 degrees or more through the forward element, and wherein the curvature of the forward element directs light into the series of elements so that the light extends along the optical axis in a parallel direction; and a sensor assembly located on the optical axis at an end opposite the first element.

15. The image capture device of claim 14, wherein the curvature of the first element substantially mirrors the curvature of the forward element.

16. The image capture device of claim 15, wherein the light is directed towards the optical axis, parallel to the optical axis, or both in an unrefracted manner as the light extends through the forward element and the series of elements.

17. The image capture device of claim 14, wherein the light extends through the forward element and some of the series of elements to a focal point and then along the optical axis.

18. The image capture device of claim 17, wherein some or all of the light crosses the optical axis as the light extends through the focal point.

19. The image capture device of claim 14, wherein the forward element is part of the series of elements, and wherein the series of elements begin with the forward element and ends with an end element, the end element being a last element of the series of elements before the sensor assembly.

20. The image capture device of claim 14, wherein the forward element has a continuous radius between the front side and the rear side.

* * * * *